(12) United States Patent
Jacobs et al.

(10) Patent No.: US 11,014,723 B2
(45) Date of Patent: May 25, 2021

(54) CONTAINER AND/OR CONTAINER LID WITH RECORDABLE AUDIO PLAYER

(71) Applicant: NobleIQ LLC, Patterson, NY (US)

(72) Inventors: Lynn P. Jacobs, Patterson, NY (US); Kurt L. Jacobs, Allen, TX (US)

(73) Assignee: NobleIQ LLC, Patterson, NY (US)

( * ) Notice: Subject to any disclaimer, the term of this patent is extended or adjusted under 35 U.S.C. 154(b) by 0 days.

(21) Appl. No.: 16/252,620

(22) Filed: Jan. 19, 2019

(65) Prior Publication Data

US 2019/0168934 A1 Jun. 6, 2019

Related U.S. Application Data

(63) Continuation-in-part of application No. PCT/US2017/043039, filed on Jul. 20, 2017.

(60) Provisional application No. 62/364,825, filed on Jul. 20, 2016.

(51) Int. Cl.
*B65D 51/24* (2006.01)
*A61J 1/03* (2006.01)
*G06F 3/16* (2006.01)
*H04R 1/02* (2006.01)
*A61J 1/14* (2006.01)
*G11B 27/10* (2006.01)

(52) U.S. Cl.
CPC .............. *B65D 51/248* (2013.01); *A61J 1/03* (2013.01); *A61J 1/1412* (2013.01); *G06F 3/165* (2013.01); *G11B 27/102* (2013.01); *H04R 1/028* (2013.01); *A61J 2205/20* (2013.01); *A61J 2205/30* (2013.01); *A61J 2205/70* (2013.01); *H04R 2400/00* (2013.01)

(58) Field of Classification Search
CPC ......... B65D 51/248; A61J 1/03; A61J 1/1412; A61J 2205/30; A61J 2205/70; G06F 3/165
USPC ....................................................... 206/534
See application file for complete search history.

(56) References Cited

U.S. PATENT DOCUMENTS

| 5,815,586 | A | 9/1998 | Dobbins |
| 6,036,017 | A | 3/2000 | Bayliss, IV |
| 7,305,344 | B2 | 11/2007 | Glynn et al. |
| 8,928,467 | B2 | 1/2015 | Jacobs et al. |
| 9,474,695 | B1 * | 10/2016 | Khalid ................. A61J 7/0409 |
| 2005/0199525 | A1 | 9/2005 | Mahoney |

(Continued)

FOREIGN PATENT DOCUMENTS

WO 2001022399 A1 3/2001

OTHER PUBLICATIONS

International Application No. PCT/US2017/043039, International Search Report and Written Opinion, dated Jan. 19, 2018, 13 pages.

(Continued)

*Primary Examiner* — Rafael A Ortiz
(74) *Attorney, Agent, or Firm* — LaBatt, LLC

(57) ABSTRACT

A lid including one or more messages relating to a product is provided. The lid can store and play one or more audio messages on an audio device attached thereto. The audio messages can be recorded onto the audio device, loaded onto the audio device at a point of sale, and/or pre-loaded on the audio device at a factory. The lid can also include one or more visual and/or surface texture indicia corresponding to the product, such as the product name, color(s) uniquely corresponding to the product, and/or the like.

12 Claims, 7 Drawing Sheets

(56) References Cited

U.S. PATENT DOCUMENTS

| | | | | |
|---|---|---|---|---|
| 2008/0277307 A1* | 11/2008 | Mazur | ................... | A61J 7/0481 |
| | | | | 206/534 |
| 2011/0119090 A1 | 5/2011 | Lazar | | |
| 2012/0305177 A1* | 12/2012 | Simmons | .................. | G09F 3/10 |
| | | | | 156/247 |
| 2013/0097973 A1* | 4/2013 | McCoy | ..................... | A61J 1/05 |
| | | | | 53/467 |
| 2015/0360834 A1* | 12/2015 | Mikhail | .............. | G06F 19/3462 |
| | | | | 340/384.5 |
| 2015/0366755 A1* | 12/2015 | Milante | .............. | B65D 43/0218 |
| | | | | 215/203 |
| 2016/0000657 A1* | 1/2016 | Dickie | .................. | A61J 7/0084 |
| | | | | 206/534 |
| 2017/0334631 A1* | 11/2017 | Veltri | ................... | B65D 43/163 |
| 2018/0343511 A1* | 11/2018 | Cooper | .............. | B65D 81/3837 |
| 2019/0125626 A1* | 5/2019 | Mejia | ........................ | A61J 1/03 |

OTHER PUBLICATIONS

VisionAware, "Products and Devices to Help You Identify Your Medications," www.visionaware.org/info/everyday-living/helpful-products/products-and-devices-to-help-you-identify-your-medications/125, Accessed Jul. 18, 2016, 6 pages.

Slash Gear "Talking Pill Bottle Patent Describes Mouthy Meds,"https://www.slashgear.com/talking-pill-bottle-patent-descibes-mouthy-meds-1310230/, Acessed Jan. 14, 2019, 2 pages.

* cited by examiner

CONTAINER AND/OR CONTAINER LID WITH RECORDABLE AUDIO PLAYER

REFERENCE TO RELATED APPLICATIONS

The current application is a continuation-in-part of PCT Application No. PCT/US2017/043039, filed on 20 Jul. 2017, which claims the benefit of U.S. Provisional Application No. 62/364,825, filed on 20 Jul. 2016, each of which is hereby incorporated by reference.

TECHNICAL FIELD

The disclosure relates generally to product information, and more particularly, to storing and conveying information and/or instructions regarding a product.

BACKGROUND ART

Many products sold to the public are packaged in containers such as cans and bottles. Many of those products have product specific information which is relevant to the buyer of that product. Existing methods of disclosing such information rely on written and/or graphic presentations included on the container's label.

One such product category is medication. Medications, whether prescribed or over-the-counter, typically involve a variety of dosage instructions, warnings, medical contraindications and other specific instructions and information. Existing methods for conveying such information and instructions typically consist of: textual and/or graphical packaging; point of sale or prescription instructions from sellers and other experts in the field, such as pharmacists, doctors, nurses, and the like. Various approaches have sought to provide reminders and alerts, including audible reminders and alerts, indicating when to take a medication or when a medicine bottle was last opened. However, the existing methods fail to provide any sort of post-sale means of easily determining or recalling specific medical instructions or information, such as warnings, medical contraindications, and specific treatments for which the medicine was prescribed, as well as other specific instructions and information. To date, these instructions and information are related orally or in writing and/or graphics by the sellers and/or field professionals or are provided using disassociated packaging elements which may be lost or result in confusion since the information is not integrated into the medicine packaging.

Although some existing methods convey dosage instructions as well as other warnings and relevant information via packaging text, the associated explanatory text is typically too small for many patients and other users or administrators of the medication to read without assistance. When legible, the instructions are often difficult to understand such that the meaning can be misconstrued. Additionally, the text for describing what the medicine is meant to remedy is typically absent. Further difficulties with current solutions are strongly correlated to the specific lexicon used for medical descriptions. When instructions, warnings, etc., are communicated orally, particularly to a spouse or other caregiver and not the patient, there is no post point-of-sale means to determine or easily recall said instructions, warnings, et al.

SUMMARY OF THE INVENTION

The inventors recognize a need for product consumers, including patients, administrators, care providers, and other users of medicine, to easily retrieve pertinent information regarding the use of the product (e.g., administration of the medicine) in question and for the information to be easily accessible at the point of need (e.g., when the medicine is to be taken or administered). Audio presentation of relevant information can replace or work in conjunction with written and/or graphical information on product labels. The invention makes such audio information readily available in sound devices which can be programmed with specific information (e.g., important to the use of the product) in a digital format and attached to the lid or body of the product container as disclosed herein.

A first aspect of the invention provides a solution for storing and playing one or more audio messages on an audio device attached to a lid for a storage container as described herein. The audio messages can be recorded onto the audio device, loaded onto the audio device at a point of sale, and/or pre-loaded on the audio device at a factory.

A second aspect of the invention provides a solution for storing and playing one or more audio messages on an audio device attached to a bottom of a storage container as described herein. The audio messages can be recorded onto the audio device, loaded onto the audio device at a point of sale, and/or pre-loaded on the audio device at a factory.

A third aspect of the invention provides a solution for storing and playing one or more audio messages on an audio device attached to or enclosed by a special housing of a storage container as described herein. The audio messages can be recorded onto the audio device, loaded onto the audio device at a point of sale, and/or pre-loaded on the audio device at a factory.

In various embodiments, the audio device can be integrated into the container, such as a container lid or a container body, so as to be considered part and parcel of the corresponding product and product packaging.

A fourth aspect of the invention provides one or more features to associate (e.g., visually, texturally, and/or the like) the audio device with the corresponding product, which can be sold and/or dispensed separately from the audio device. For example, an embodiment provides a container lid (or container) having an audio device preconfigured with a set of audio messages specific to a particular product (e.g., a particular medication), which includes the product name on the container lid. The container lid can further have a unique combination of one or more of a plurality of colors and/or a plurality of textures to associate the container lid with the product. When the audio device is included on a lid that can be completely detached from the corresponding packaging, the packaging can include one or more visual and/or textural indicators to relate the packaging with the lid. For example, when the lid has unique color(s), the product packaging can include a mechanism, such as a band, attached thereto, which has the same color(s) as the lid.

An illustrative embodiment includes an audio device and system enabling the storage and playback of information relevant to the product or the user of the product, such as specific medicines and/or patients. The audio device and supporting system disclosed herein can account for any combination of factory, value added processes and point-of-sale information to be loaded into the audio device for playback at a later time.

In an illustrative embodiment, the inventors propose to provide a solution which includes an audio device with one or more recorded messages attached to a package container, such as a medicine bottle, on or under a cap of the bottle, or in any other way attached to the medicine container or another container used to store some or all of the medicine (e.g., a weekly medicine sorting container), such that the audio device and the medicinal packaging or container are considered a single entity or joined entity. The audio device can have a switch, button, or other means, whereby one or more messages containing all pertinent information can be played back so that information regarding the medicinal contents can be easily understood by a patient, caregiver, or any other person associated with the administration of the medicine.

A more specific illustrative embodiment provides an audio playback system that enables specific information to be conveyed at any time to relevant parties involved in the administration of medication comprising: an audio device, stored audio information, a means to attach the audio device to the lid of a container or packaging and a means to playback the information; a first agent in a plurality of agents to program a plurality of audio playback devices associated with specific medicinal information and/or specific patient information, the plurality of audio playback devices having any combination of one or more of a plurality of methods to attach such devices to a plurality of container bodies and/or container lids.

An additional particular illustrative embodiment provides an audio playback system that enables specific audio information to be conveyed at any time to relevant parties involved in the administration of food, herbal supplements, and/or the like, comprising: an audio device, stored audio information, a means to attach the audio device to the lid of a container or packaging, and a means to playback the information; a first agent in a plurality of agents to program a plurality of audio playback devices associated with specific medicinal information and/or specific patient information, the plurality of audio playback devices having any combination of one or more of a plurality of methods to attach such devices to a plurality of container bodies and/or container lids.

Embodiments can include visual and/or textural indicators to relate a detached part of product packaging and/or one or more parts of product packaging distributed and/or sold separately, to a product or other product packaging parts. The visual and/or textural indicator(s) can have a color and/or texture unique to a particular product that may be dispensed in substantially similar product packaging. The color can be selected to be readily associated with the product, such as have the same color as the product. Additionally, a mechanism, such as a band or the like, having the same visual and/or textural indicator(s), can be distributed with the detachable part, which can be attached to another part of the product packaging to enable ready association of the two parts.

Other aspects of the invention provide methods, systems, program products, and methods of using and generating each, which include and/or implement some or all of the actions described herein. The illustrative aspects of the invention are designed to solve one or more of the problems herein described and/or one or more other problems obvious to those skilled in the art but not explicitly discussed herein.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
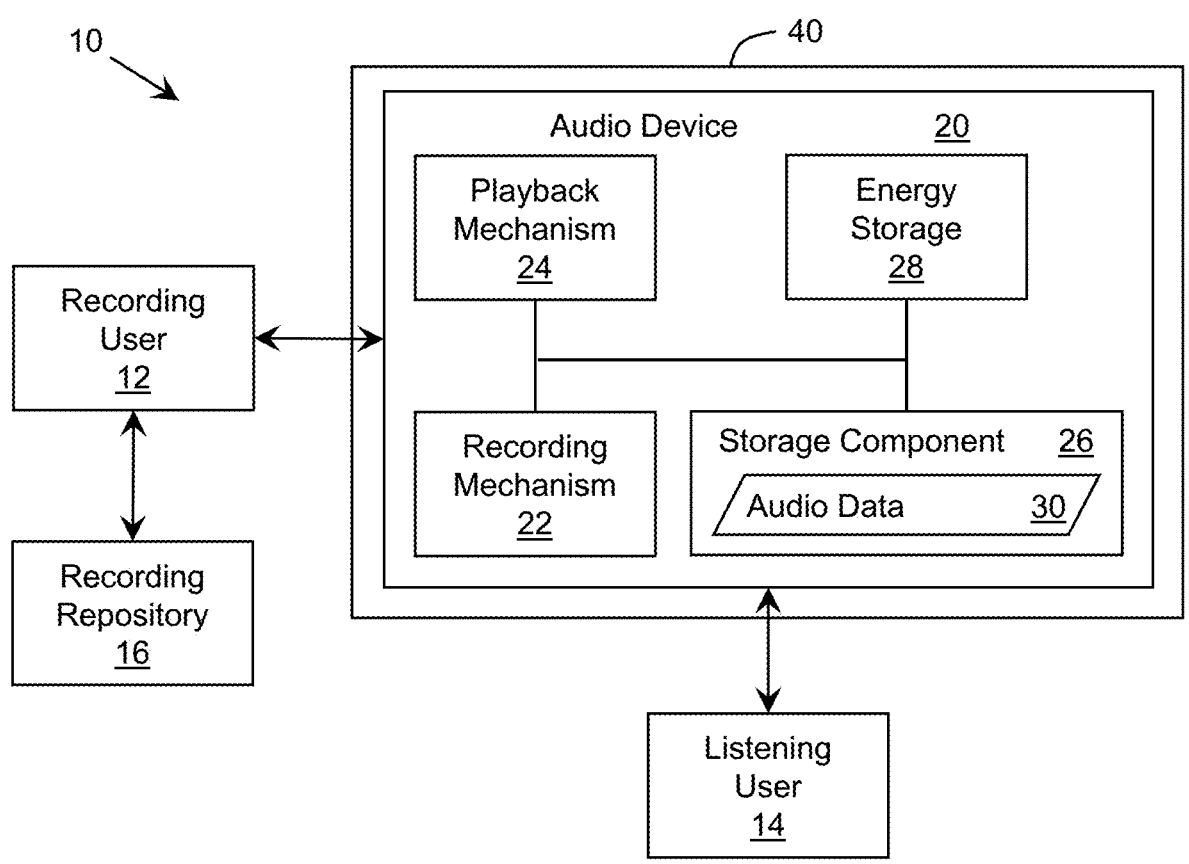
FIG. 1 shows an illustrative environment for managing product information according to an embodiment.

As indicated above, aspects of the invention provide a solution for storing and playing one or more audio messages on an audio device attached to a lid for a storage container as described herein. The audio messages can be recorded onto the audio device, loaded onto the audio device at a point of sale, and/or pre-loaded on the audio device at a factory. The lid can also include one or more visual and/or surface texture indicia corresponding to the product, such as the product name, color(s) uniquely corresponding to the product, a textured pattern, and/or the like.

In a more particular embodiment, aspects of the invention provide a solution which includes an audio device with one or more recorded messages attached to a medicine bottle, on or under a cap of the bottle, or in any other way attached to the medicine container or another container used to store some or all of the medicine, such that the audio device and the medicinal packaging or container are considered a single entity or joined entity. The audio device can have a switch, button(s), or other means, whereby one or more messages containing all pertinent information can be played back so that information regarding the medicinal contents can be easily understood by a patient, caregiver, or any other person associated with the administration of the medicine.

Some embodiments of the invention can utilize one or more pre-recorded messages which specify when, how often, and/or in what manner the associated medicine should be taken or administered. Other embodiments include one or more messages recorded at the point of sale/prescription by field professionals, which also detail instructions and other pertinent information regarding the specific medicine in question and/or the patient involved. Pertinent information includes, but is not limited to, name of the medicine, dosage, intended use of the medicine, expiration date, remaining refills, administration instructions, warnings, contraindications, other medicines and/or substances to avoid while taking the medication, length of time medicine should be taken, description of the medicine's effects on the patient, and/or the like.

In some embodiments, a pre-recorded message and/or a message recorded at the point of sale/prescription can convey information tangentially relating to the medicine. For example, such a message can convey information regarding: a condition related to and/or being treated by the medicine; a related medicine (e.g., another medicine recommended to have on hand); a related condition (e.g., a side effect, an condition having a higher likelihood of occurring); a recommendation for patients taking the medication and/or their caregivers; a company involved in the manufacture and/or distribution of the medicine (e.g., promoting the company or another product offered by the company); and/or the like.

Some embodiments of the invention can utilize one or more indicia, such as visual and/or surface texturing indicia, to associate a product packaging part with a pre-configured audio device with the product and/or another product packaging part from which the pre-configured product packaging part can be detached or separately provided.

As used herein, unless otherwise noted, the term "set" means one or more (i.e., at least one) and the phrase "any solution" means any now known or later developed solution.

Turning to the drawings, FIG. 1 shows an illustrative environment 10 for managing product information according to an embodiment. To this extent, the environment 10 includes an audio device 20 attached to a container lid 40. The audio device 20 can be utilized in a process described herein in order to store and provide information regarding a product stored in a corresponding container using an auditory solution. In particular, the audio device 20 is shown including a recording mechanism 22, which enables one or more recordings to be stored in a storage component 26 of the audio device 20 as audio data 30, and a playback mechanism 24, which enables a recording stored as audio data 30 to be played back at a designated time.

During use, a recording user 12 can activate a recording mechanism 22 on the audio device 20 to record an audio message as audio data 30. Any recording mechanism 22 can be utilized. For example, the recording mechanism 22 can include a button that is depressed while the recording user 12 speaks into a microphone of the recording mechanism 22. The detected sounds can be converted to digital data by the recording mechanism 22 (e.g., using an analog to digital converter) and stored as audio data 30 in the storage component 26.

However, it is understood that this is only illustrative of how audio data 30 can be stored on the storage component 26. For example, in another embodiment, the recording user 12 can utilize an external computing device, such as a personal computer, a smart phone, and/or the like, to record a message, which is subsequently communicated to the audio device 20 via the recording mechanism 22 using any solution. For example, the recording mechanism 22 can be configured to communicate using any wired and/or wireless solution, such as via a universal serial bus (USB) communications solution, a Bluetooth wireless communications solution, and/or the like.

In another embodiment, a recording user 12 can select one or more available recordings from a recording repository 16 and provide the selected recording(s) for storage on the audio device 20 via the recording mechanism 22 (e.g., a communications device). In this case, the recording repository 16 can comprise a database of recordings, which can be stored locally on a computing device of the recording user 12, available on a remote database accessed by the recording user 12 via a public network such as the Internet, at a factory packaging the product, and/or the like.

The audio device 20 including one or more messages stored as audio data 30 can be utilized by a listening user 14 to receive desired information. In particular, the listening user 14 can utilize a playback mechanism 24 to cause one or more of the messages stored as audio data 30 to be played by the audio device 20. To this extent, the playback mechanism 24 can include a speaker, a digital to audio converter, and one or more mechanisms for selecting and/or requesting a message stored as audio data 30 to be played back. For example, the playback mechanism 24 can include a button, which when pressed causes a stored recording to be played.

The playback mechanism 24 can include multiple buttons for selection of different recordings and/or different types of recordings, or a different recording can be selected based on how the button is operated. For example, when pressed once, a first audio recording can begin playing. If pressed again, the audio device 20 can stop playing the recording and play a second audio recording stored as audio data 30. Furthermore, the playback mechanism 24 can enable separate access to different types of recordings. For example, the playback mechanism 24 can include a first button to play a factory-installed recording, a second button to play a recording loaded via a communications device (e.g., a point-of-sale recording), and a third button to play a message directly recorded on the audio device 20. Regardless, it is understood that these are only illustrative of numerous solutions and mechanisms for activating and/or selecting a recording.

The audio device 20 can further include an energy storage component 28, which provides sufficient power to operate the audio device 20 for a desired length of time. In an embodiment, the energy storage component 28 comprises a set of batteries. The batteries can be replaceable and/or rechargeable.

Embodiments can utilize a representation of instructions and other information loaded by a factory, supplier, a point of sale operator or field professional into the audio device. Representations include, but are not limited to, electronic representations such as way, mp3 files, etc. Representations of the audio format can be stored as audio data 30 in the storage component 26 using magnetic media, optical encoding and storage, etc. Embodiments can include means (e.g., recording mechanism 22) of transferring audio instructions and other information from an external agent to the audio device 20 such as is commonly found on personal computers, tablets and smart phones via hardware, firmware and cable devices.

As described herein, an embodiment of the audio device 20 can be utilized in conjunction with a storage device for medications. To this extent, both over the counter and prescribed medications have inherent dosage, contraindications, intended use for specific ailments, expiration dates and supplemental information as required for the safe ingestion of the medication. Since existing methods of capturing that information are inadequate for timely and comprehensive dissemination to concerned patients and/or others involved in patient care, embodiments of the invention can be utilized to remedy such inadequacies by providing recorded audio versions of various pertinent information by attaching the audio device 20 to the storage device in any one of several methods ensuring timely availability of this important, potentially lifesaving information. Embodiments of the audio system and process can be utilized to solve such problems which might result from the incorrect administration of medications.

Embodiments of the invention include, but are not limited to, a solid state audio device 20 (e.g., similar to an audio device found in greeting cards, stuffed toy animals, and other novelty and/or professional devices). Other embodiments can utilize a custom audio device 20 available from retail, wholesale, manufacturing and engineering entities. The audio device 20 can be programmed (e.g., include audio data 30) with the medicine specific information prior to, and/or at the point of sale, which can be played back on demand when activated to inform patients and/or other administrators of the medicine during such administration of said medication.

Embodiments of the invention provide an audio device 20 which is programmed with a plurality of medicine specific and/or patient specific information. The specificity of information stored on the audio device 20 can include all relevant and distinguishing data necessary or likely necessary for the correct administration of the medication for the patient.

Embodiments of the solution described herein differ from and improve upon currently existing methods of informing patients and/or other medicine administrators in regard to specifics of the medicine in question. For example, embodiments of the invention can provide point of need audio information which may be used by patients and other administrators in determining whether such a medication is appropriate for administration given certain current (or static) and dynamic conditions of the intended patient. It may be determined by such administrators and/or patients that a delay in the administration of said medicine is warranted until other, associated conditions are met. Such conditions include, but are not limited to, last ingestion of a specific food, anticipated next ingestion of a specific food, time remaining before sleep, anticipated activities for which said medicine is incompatible, contraindications of said medication, or other medications to avoid when taking said medication, etc. Other dynamic conditions are anticipated and well understood by those skilled in the craft of medicine and associated best practices.

Furthermore, some embodiments of the audio device 20 allow point of sale professionals to include patient specific information such as taking into account other medications the patient is currently taking and/or is prescribed. Such information can include warnings, dosages, timing instructions to avoid interaction with the other medications and like warnings and/or advisories. Additionally, patient-specific information can include various other types of information, such as an encouraging message from a family member.

In illustrative embodiments of the invention, medicine specific and/or patient information can be played back using an audio device 20 which is attached to the medicine packaging or container lid.

To this extent, FIGS. 2A-2D show illustrative medicine caps 40A-40D with audio devices 20 incorporated therein according to embodiments. As illustrated, the audio devices 20 can include various different mechanisms for activating playback of a recording and/or initiating recording. However, it is understood that these mechanisms as well as a manner in which the audio device 20 is incorporated into the medicine cap 40A-40D are only illustrative of various approaches.

Figure 2A:
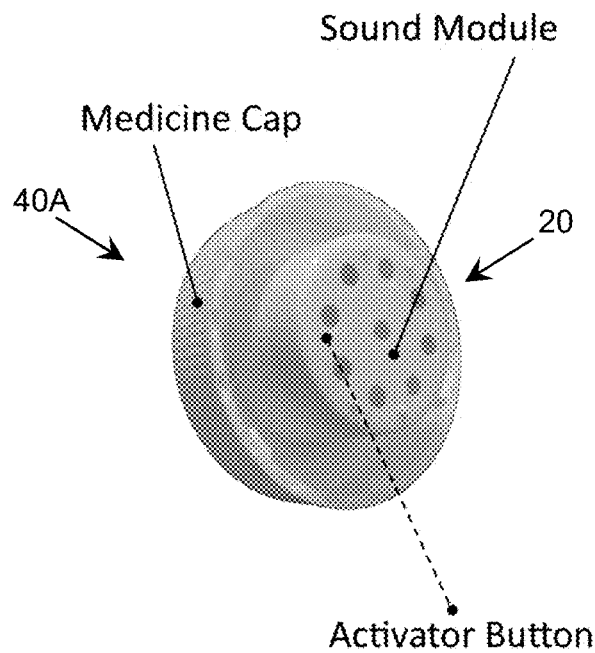
FIGS. 2A-2D show illustrative medicine caps with audio devices incorporated therein according to embodiments.

Regardless, in FIG. 2A, the medicine cap 40A is shown including an audio device 20, for which playback is enabled by pushing one of a plurality of activator buttons located on a housing including the sound module and audio device therein. In this case, playback of the audio message(s) can occur when a corresponding activator button is pressed. An embodiment can enable the recording of a different audio message(s) associated with one or more of the activator buttons, e.g., based on how the activator button is operated (e.g., press and hold to record new message, and/or the like). In an embodiment, at least one activator button is associated with a pre-configured audio message that can not be replaced after fabrication of the medicine cap 40A.

Figure 2B:
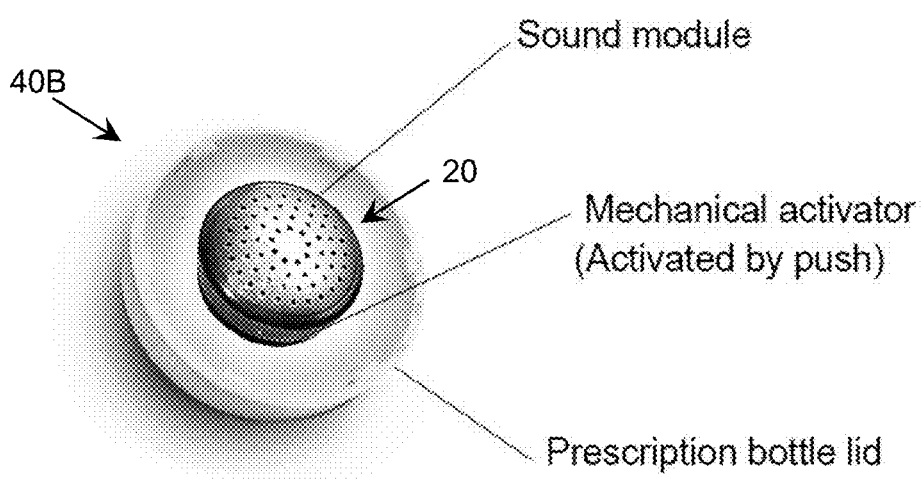

In FIG. 2B, the medicine cap 40B is shown including an audio device 20, for which playback is enabled by pushing an activator button including the sound module and audio device therein. In this case, playback of the audio message(s) can occur when the activator button is pressed. An embodiment can enable the recording and/or playback of different audio message(s) based on how the activator button is operated (e.g., press and hold to record new message, press multiple times to select recording for playback, and/or the like).

Figure 2C:
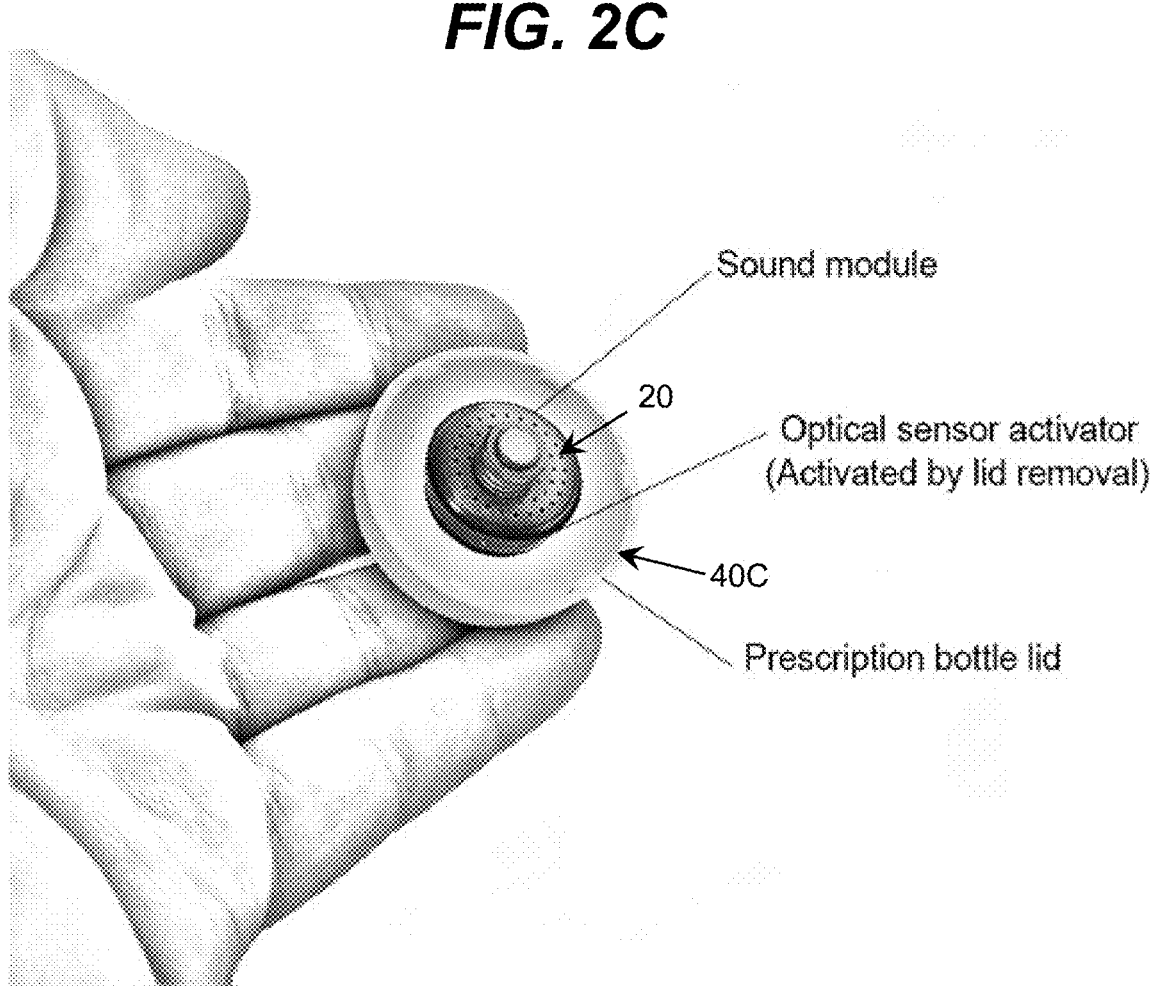
Figure 2D:
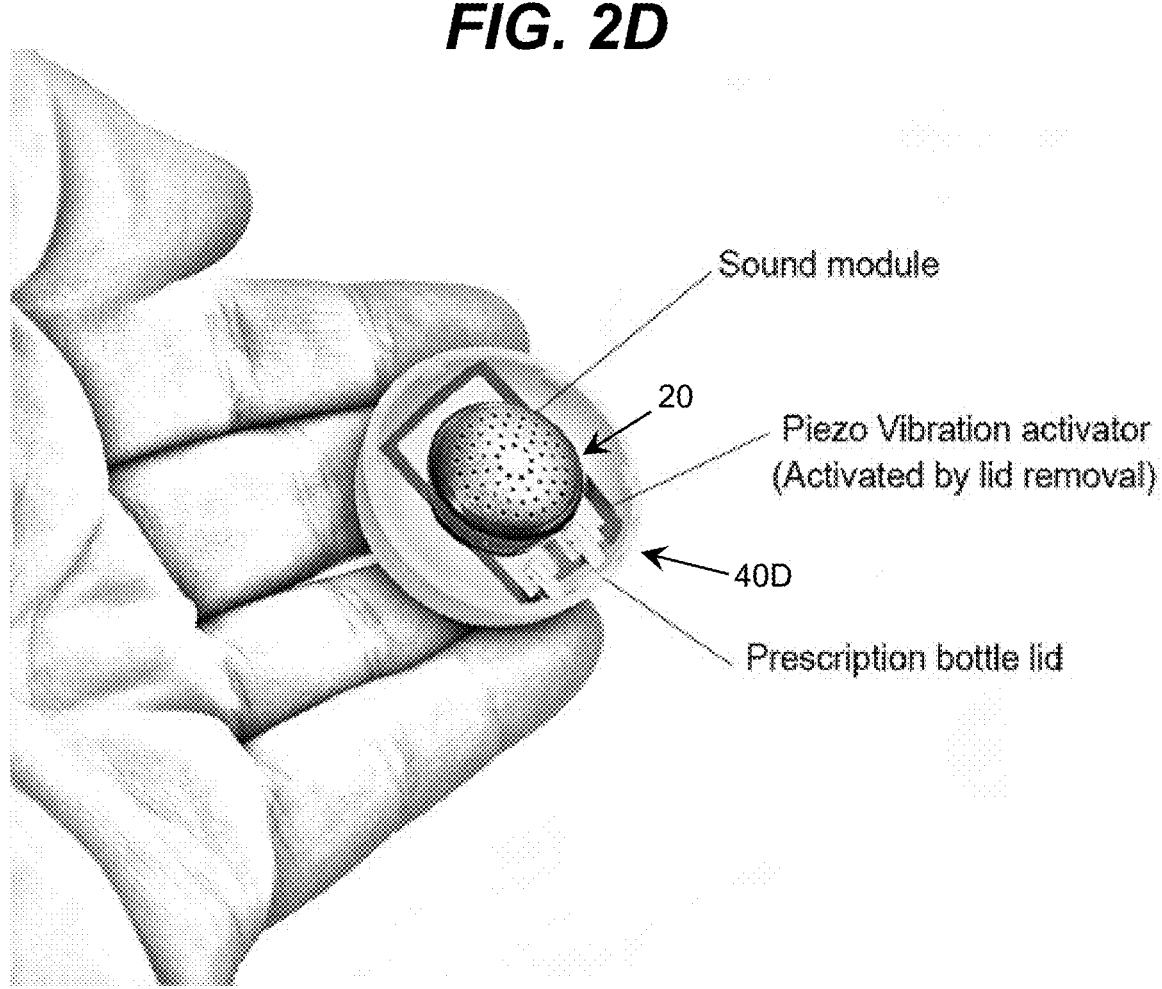

In FIG. 2C, the medicine cap 40C is shown including an audio device 20 with an optical sensor for activating playback of an audio recording. In this case, the playback can automatically start in response to the cap 40C being removed from the container. Similarly, in FIG. 2D, the medicine cap 40D is shown including an audio device 20 with a piezo vibration playback activator. Playback of an audio recording also can automatically commence in response to the medicine cap 40D being removed from the container.

It is understood that that embodiments of a medicine cap described herein can include any combination of two or more of the recording and/or playback mechanisms shown in FIGS. 2A-2D. To this extent, the features shown in FIGS. 2A-2D are not exclusive of other features that can be implemented in embodiments described herein.

Embodiments provide a pharmaceutical audio system, which makes use of prerecorded audio devices (e.g., a sound module, message sound box, music box, mini speaker or micro speaker, in conjunction with a switch mechanism to activate the audio and a portable energy storage device such as a watch battery, etc.).

Embodiments can include various different agents including, for example: a first agent to host and store the audio information prior to transfer (e.g. a computer, smart phone, tablet or other suitable electronic device, etc.); a second agent to record the information (e.g. microphone system with the ability to transfer the audio information to the first agent); a third agent used in conjunction with, or without the second agent and used to download pre-recorded information and an ability to transfer the audio information from a host site to the first agent; a fourth agent used to transfer and monitor the transfer of information from the first agent to the audio device.

Various elements of an embodiment of a pharmaceutical audio system and process for enabling playback of information may be related in the following exemplary fashion. It is not intended to limit the scope or nature of the relationships between the various elements of the pharmaceutical audio system and process for enabling audio playback and the following examples are presented as illustrative examples only. Embodiments of the described pharmaceutical audio system and process for enabling the playback option based on medicine and/or patient specific information make use of a prerecorded audio device comprising an audio module, energy storage device and speaker system, an electronic representation of relevant instructions and information, a means of activating audio playback and a means of attaching the prerecorded audio device to the medicine container lid, cap, or the like.

An illustrative system and process for enabling the playback of audio at point of need can operate by installing an electronic format of the informational instructions onto an audio device 20 which stores the information in a storage component 26, which can comprise a permanent and/or semi-permanent medium. The audio device 20 is attached to the container lid 40 and includes a playback mechanism 24 which enables playback of the information on demand.

The above-described embodiment of the pharmaceutical audio system and process for enabling audio playback is presented for purposes of illustration and not of limitation. While this embodiment of the pharmaceutical audio system and process for enabling a playback option has been described with reference to numerous specific details, one of ordinary skill in the art will recognize that the audio playback system and process for installing information on the device can be embodied in other specific forms without departing from the spirit of the audio system. Thus, one of ordinary skill in the art would understand that the audio system and process to enable playback is not to be limited by the foregoing illustrative details, but rather is to be defined by the appended claims.

As discussed herein, embodiments can include means of attaching the audio device 20 to a container lid 40 (e.g., cap) or like aspect of a product container (e.g., pill bottle, etc.).

Any suitable solution for temporarily or permanently securing the audio device 20 to the container lid 40 can be utilized. In an embodiment, the audio device 20 can be secured to the container lid 40 using struts, which cradle the audio device. In another embodiment, the audio device 20 can include an extended edge or lip around its extremity, which is sized to allow the audio device 20 to be attached to the container lid 40.

Furthermore, an embodiment of a container lid 40 can include partitions, or the like, which can be formed between the audio device 20 and the product stored within the container, thereby keeping the audio device 20 from contacting the associated product. Other approaches can be used to seal the top of the container lid 40 from view by covering the container lid 40 with another material, such as a correctly sized sticker, where such material adds value by providing a plurality of benefits such as an area for printed barcodes and other information. Such coverings are specified so as to not obstruct the operation of the audio activation mechanism.

In one embodiment of the invention, a cylindrical audio device 20 is installed in a specifically designed container lid 40 with a means of sound actuation freely available to the user of the audio. It is understood that a cylindrical property is only illustrative of a specific embodiment of the invention and does not limit the utility of the invention to audio devices 20 having specific properties.

Embodiments of the invention include a specially designed container lid 40 which includes a specifically designed and dimensioned opening through which an associated audio device 20 is installed and attached to the container lid 40. It is understood that the opening required for installation includes, but is not limited to, properties of the audio device 20 such as its shape, width, height, length and attached and unattached accessories associated with the audio device 20.

In other embodiments, a specially designed container lid 40 includes a strut which descends downward from the container lid 40 having a foot at the terminal end which extends at least part ways across the audio device 20 helping to secure the audio device 20 in place. Said strut may likewise ascend upward from a lower attachment point on the container lid 40 to help secure the audio device 20 to the container lid 40.

In other embodiments, a specially designed housing can be manufactured into the container lid 40 which provides an enclosure for the audio device 20. The housing can further isolate the audio device 20 completely so as to provide a hermetic barrier between the audio device 20 and the associated product stored in the container.

An embodiment provides a container lid 40, which can be provided separately from the corresponding container and/or lid with the container. In this case, the container lid 40 with the audio device 20 can be used to replace a standard container lid 40 provided by a manufacturer. Such a replacement can be made at a point of sale (e.g., by the pharmacist) and/or by the consumer (e.g., the patient or caregiver).

As illustrated in FIGS. 2A-2D, the mechanical activator and sound module can be located on an interior surface of the container lid 40. In an alternative embodiment shown in FIGS. 3A-3C, a container lid 40E can include a mechanical activator 42 located on an exterior surface of the container lid 40E. For example, the mechanical activator can comprise a push button control. As illustrated, the audio device 20 (or at least a speaker therefor) can be located on an interior side of the container lid 40E.

Figure 3A:
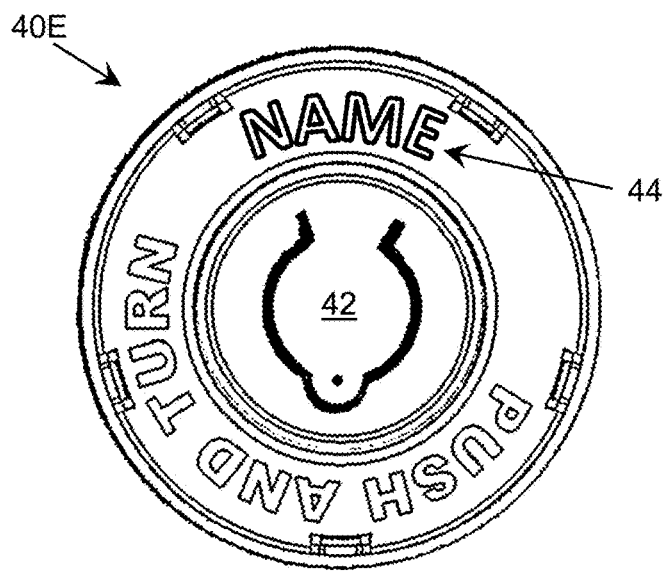
FIGS. 3A-3C show top, side, and bottom views, respectively, of an illustrative medicine cap with an audio device incorporated therein according to another embodiment.
Figure 3B:
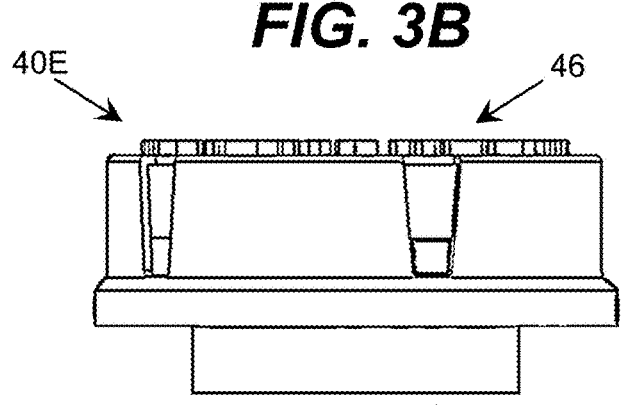
Figure 3C:
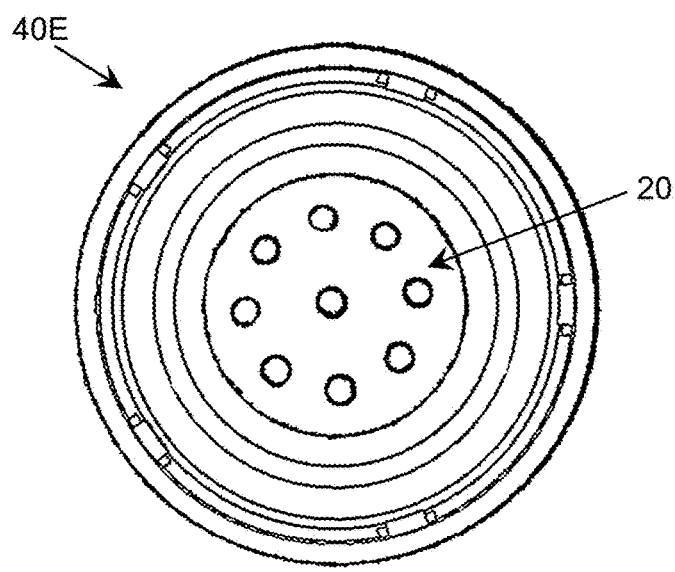

An embodiment provides a container lid 40 customized for a particular product, such as a medicine. In this case, the container lid 40 can be pre-configured with one or more standard audio messages relating to the product. Additionally, the container lid 40 can include one or more visual indicators of the product. For example, as illustrated in FIG. 3A, the container lid 40E can include the product name 44 printed on an external surface of the container lid 40. For example, the product name 44 can be imprinted using raised letter-shaped surfaces 46 as illustrated in FIG. 3B. In a further embodiment, the container lid 40 can have a color, which is unique to the corresponding product. For example, when the product is a medicine, the lid can have color(s) that are substantially the same as the color(s) of the medicine. In an embodiment, the raised surfaces forming the product name on the lid have a color that is different than the color(s) of the remainder of the lid, thereby making the text easier to read.

Figure 4A:
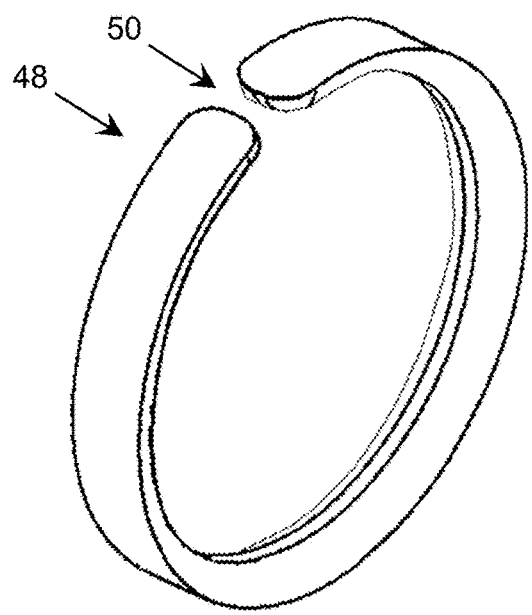
FIGS. 4A-4C show first perspective, front, and second perspective views of an illustrative band according to an embodiment.
Figure 4B:
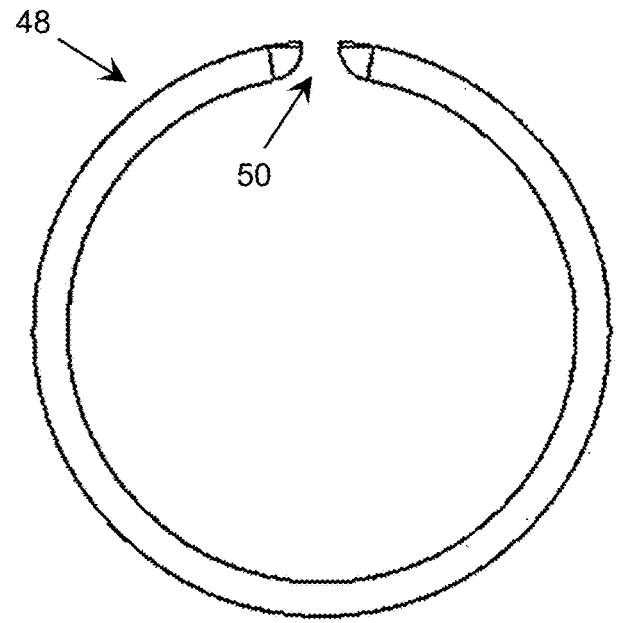
Figure 4C:
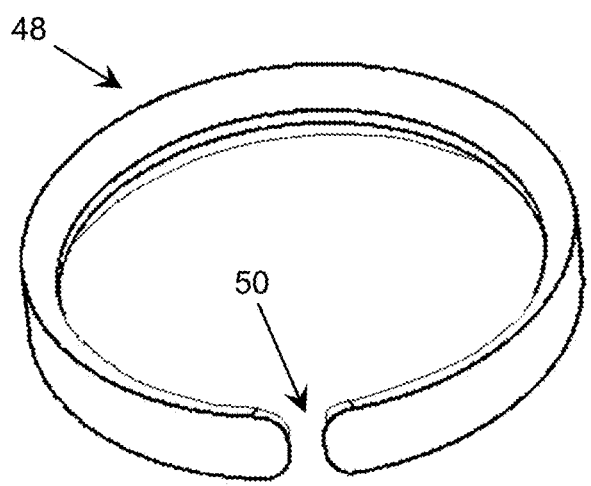

An embodiment provides one or more mechanisms for associating a customized container lid 40 with a corresponding container storing the product. For example, in embodiments the container lid 40 can be distributed separately from the container, which can comprise a generic container used to store various different types of products (e.g., medications). To this extent, FIGS. 4A-4C show various views of an illustrative band 48, which can be used to associate a container lid 40 described herein with a corresponding container. In particular, the band 48 can be configured to be slipped onto a container and held in place. To this extent, the band 48 can include an opening 50, which can allow the band 48 to stretch to accommodate a larger container circumference, thereby being held in place by tension. However, it is understood that this configuration is only illustrative.

Figure 5:
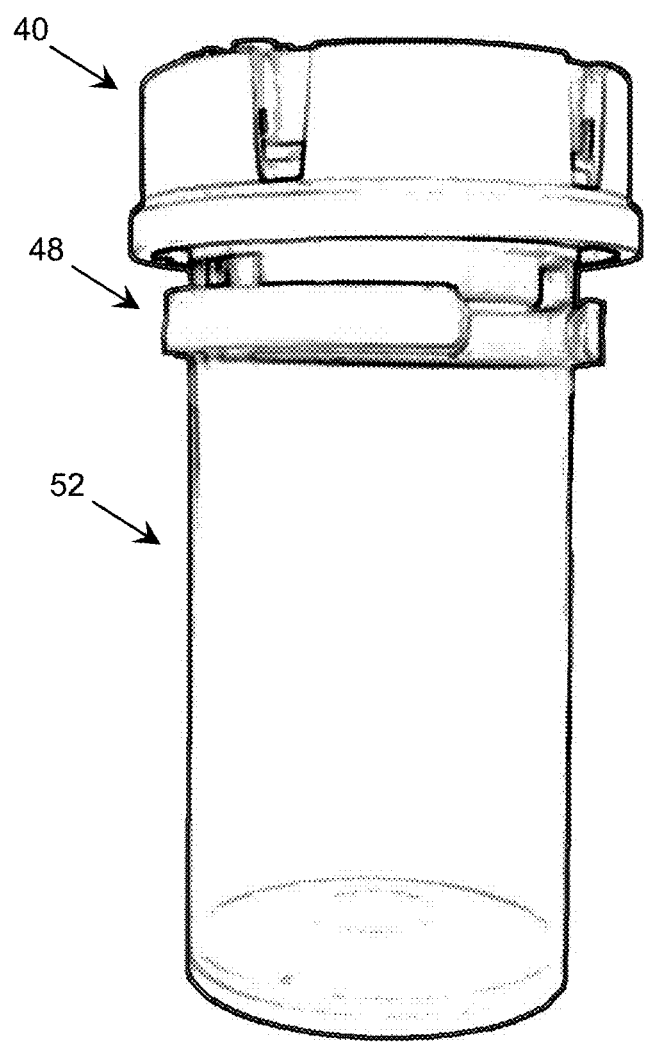
FIG. 5 shows an illustrative medicine bottle including a medicine cap described herein and an associated band according to an embodiment.

FIG. 5 shows an illustrative container 52 with a band 48 and corresponding container lid 40 located thereon. As illustrated, the band 48 can have one or more visual and/or textural attributes that associate the band 48 with the corresponding container lid 40, e.g., color. In this case, should an individual remove the container lid 40, the individual can readily identify which container 52 corresponds to the lid by matching the unique attribute(s) of the container lid 40 with those of the corresponding band 48.

It is understood that any of various types of products can be stored in the container, and the container can have any corresponding size for storing such products. In addition to medications, illustrative products include hazardous materials (e.g., cleaning products), food or other perishable items (e.g., allergen warnings), cosmetics, and/or the like. Similarly, the container lid 40 can have any shape and can be configured for removal for access to the product stored in the container or be configured to remain on the container when the product is utilized.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A storage system for prescribed medicine, the storage system comprising:
    a container for holding the prescribed medicine;
    a lid for the container, wherein fabrication of the lid includes customizing the lid for the prescribed medicine, the lid comprising:
        means for permanently visibly identifying the prescribed medicine for which the lid was fabricated;
        means for storing a set of audio messages relating to the prescribed medicine, wherein the means for storing includes at least one factory-installed audio message specific to the prescribed medicine, and wherein the at least one audio message specific to the medicine cannot be replaced after fabrication of the lid;
        an audio device permanently attached to the lid; and
        means for selectively activating the audio device to play an audio message of the set of audio messages relating to the prescribed medicine.

2. The system of claim 1, wherein the means for permanently visibly identifying includes a product name of the medicine imprinted on the lid.

3. The system of claim 1, wherein the means for permanently visibly identifying includes a color of the lid assigned to the medicine.

4. The system of claim 3, wherein the color corresponds to a color of the medicine.

5. The system of claim 1, wherein the set of audio messages includes a plurality of audio messages.

6. The system of claim 5, wherein the means for selectively activating includes a plurality of message selection mechanisms, wherein each message selection mechanism plays a unique one of the plurality of audio messages.

7. The system of claim 1, wherein the means for selectively activating includes a button accessible while the lid is secured to the medicine bottle.

8. The system of claim 1, wherein at least one of the set of audio messages is recorded at a point of sale of at least one of: the lid or the medicine.

9. The system of claim 1, the lid further comprising means for recording a second audio message at a point of sale for the prescribed medicine.

10. The system of claim 1, wherein the means for selectively activating includes a set of push buttons.

11. The system of claim 1, further comprising means for identifying the container corresponding to the lid.

12. The system of claim 11, wherein the means for identifying includes a band having a color corresponding to a color of the lid.

* * * * *